United States Patent [19]
Travis et al.

[11] Patent Number: 5,411,356
[45] Date of Patent: May 2, 1995

[54] SELF-LOCKING STRUT NUT SYSTEM

[75] Inventors: Harry Travis, Beloit; Gordon J. Grice, Janesville, both of Wis.

[73] Assignee: Custom Industrial Products, Beloit, Wis.

[21] Appl. No.: 124,589

[22] Filed: Sep. 20, 1993

Related U.S. Application Data

[63] Continuation-in-part of Ser. No. 907,513, Jul. 1, 1992, Pat. No. 5,251,857.

[51] Int. Cl.⁶ .................. F16B 27/00; F16B 37/00; F16L 3/08
[52] U.S. Cl. ....................... 411/85; 411/104; 411/432; 248/62
[58] Field of Search .............. 411/104, 84, 85, 182, 411/432, 173, 177; 248/62, 74.1

[56] References Cited

U.S. PATENT DOCUMENTS

| | | | |
|---|---|---|---|
| 4,666,355 | 5/1987 | Stover | 411/85 |
| 4,840,525 | 6/1989 | Rebentisch | 411/85 |
| 5,067,863 | 11/1991 | Kowalski | 411/85 |
| 5,165,628 | 11/1992 | Todd et al. | 248/62 |

*Primary Examiner*—Neill R. Wilson
*Attorney, Agent, or Firm*—M. K. Silverman

[57] ABSTRACT

A self-locking strut-nut system for securement within a longitudinal constructional rectangular channel includes an element for selectable lockable engagement with the rectangular channel, such element defining a medial plane of the nut system. Such system also includes an element for threadably receipt of a complementally threaded rod, such receipt element having an axis transverse to such medial plane, the receipt element extending in length of the strut-nut system along such axis which exhibits upper and lower ends. The system also includes a rigid planar washer having an aperture. The system additionally includes an element for selectable engagement within the rigid washer, such engagement element extending integrally downwardly from a lowermost plane of the system, co-parallel to the medial plane of the system and transverse to the axis of the receipt element. Accordingly, the washer is secured transversely to the axis of the receipt element and against the lowermost plane of the system. The aperture of the washer is positioned axially symmetrically about the axis of the threadable receipt element of the system.

3 Claims, 4 Drawing Sheets

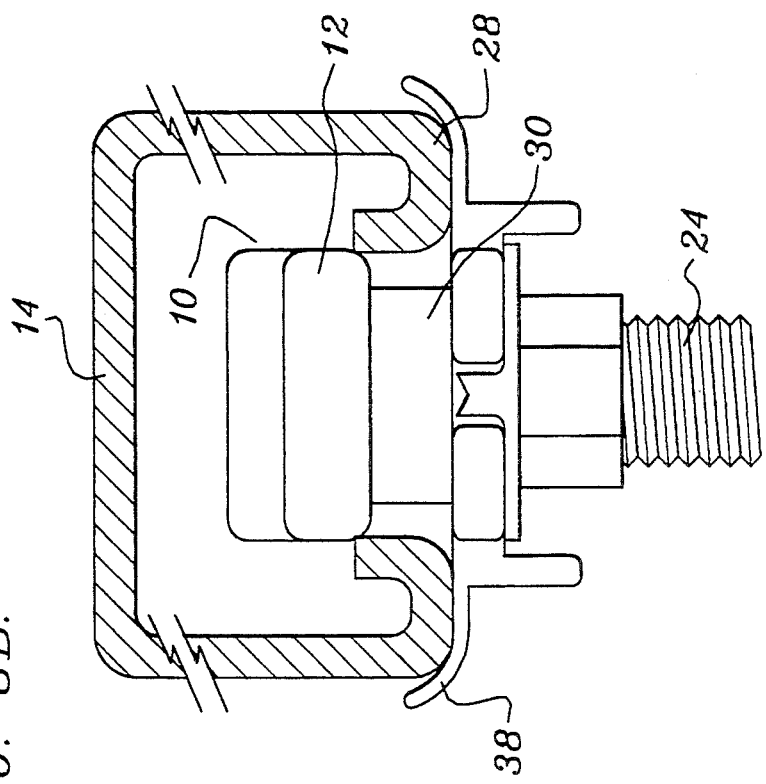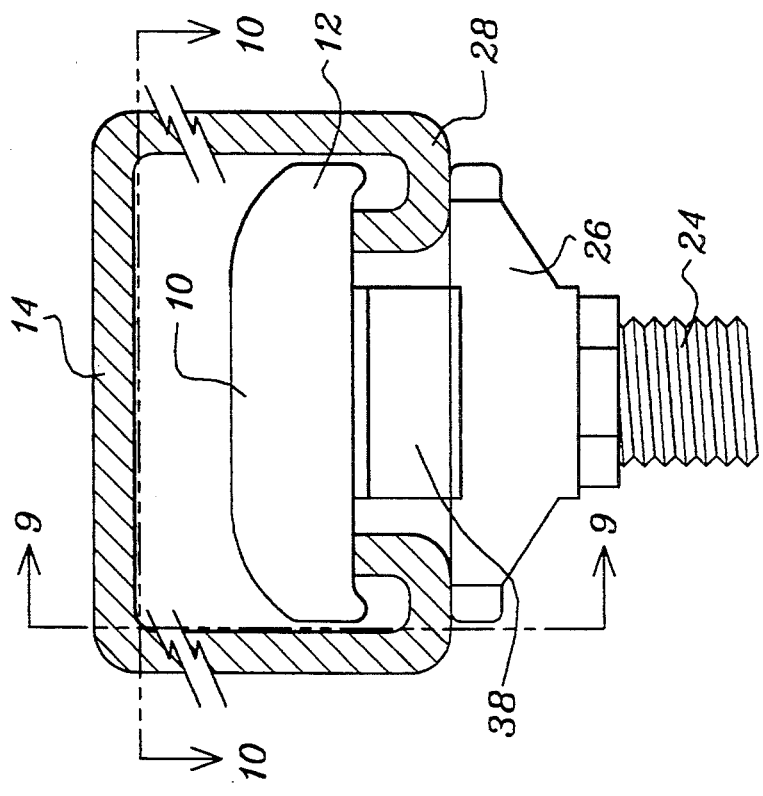
FIG. 8A.
FIG. 8B.

SELF-LOCKING STRUT NUT SYSTEM

REFERENCE TO RELATED APPLICATION

This case is a continuation-in-part of application Ser. No. 07/907,513, filed Jul. 1, 1992, entitled Suspendable Conduit Bracket System, now U.S. Pat. No. 5,251,857.

BACKGROUND OF THE INVENTION

The present invention relates to a strut-nut system for the suspended securement, typically at or near ceiling level, of a threaded rod which, in turn, secures selective conduits including, without limitation, electrical and fluid conduits.

In the prior art, the installation of ceiling pipes in residential, commercial and industrial environments has been a tedious and costly undertaking. Further, the process of servicing such conduits, once installed, has proven to be difficult, expensive and time-consuming.

The present invention represents a companion invention to the Suspendable Conduit Bracket System referenced above, primarily for use in the so-called UNI-STRUT area, to applications in combination with a threaded rod, such use optionally including use of a so-called Tinnerman snap-nut.

No prior art known to the inventors discloses a means for securing a rod to a threaded rod having compatibility for use with a UNI-STRUT hanger. The UNI-STRUT is a multi-purpose suspension system which takes the form of a suspended hollow channel having a rectangular cross-section having top, left and right sides thereof and also having, as a bottom surface thereof, resilient, typically polymeric, elements secured within edges or tracks at the left and right sides thereof. The concept of the UNI-STRUT hanger is that brackets of various types can be secured at selectable elevation and angulation thereto after the UNI-STRUT hanger itself has been suspended at a desired height and axis within or upon a particular structure. Also, elements may be selectably slidable within the left and right securing edges (tracks) thereof to provide for moveability, of any bracket secured thereto, relative to the axis of the UNI-STRUT.

Once the appropriate bracket is secured to the UNI-STRUT, mechanical means of various types may be nested within such bracket structure for selectable coupling and decoupling therewith. The instant invention relates to one such means, namely, a strut-nut to which may be secured rigid threaded member.

The present system is formed completely of components that may be selectably coupled, as by snap-and twist-fitting, to form common connections between all such components, thusly eliminating the need for much of the laborious aspects associated with the installation of conduit piping in the prior art. It is, accordingly, as a response to such limitations in the art that the present invention is directed.

SUMMARY OF THE INVENTION

The present invention relates to a self-locking strut-nut system for securement within a constructional rod having a longitudinal rectangular channel therewithin. The strut-nut system includes upper means proportioned for selectable lockable engagement within said rectangular channel, said means defining a medial plane of said strut-nut system, said means also defining a major axis and a minor axis, each co-parallel with said plane; means for threadable receipt of a complementally threadable rod, said receipt means having an axis transverse to said medial plane, said receipt means extending a length of said strut-nut system along said transverse axis, said axis having upper and lower ends thereto; lower means proportioned for selectable lockable engagement externally against and beneath said rectangular channel, said engagement means extending integrally downwardly from said medial plane of upper engagement means and defining, co-parallel to said medial plane, a lowermost plane, said lower engagement means also defining major and minor axes respectively, co-parallel to said major and minor axes of said upper channel engagement means; and two deformable locking fins depending integrally outwardly and oppositely along said major axis of said lower engagement means.

It is an object of the present invention to provide a self-locking strut-nut system particularly adapted for use with constructional rods of the uni-strut type, such rods having therewithin a longitudinal rectangular channel.

IL is another object of the present invention to provide a self-locking strut-nut system of a type usable with a suspendable conduit bracket system of the type disclosed in application Ser. No. 07/907,513 now U.S. Pat. No. 5,251,857.

It is a further object of the present invention to provide a means of interfacing a threaded rod with a constructional rod of the uni-strut type.

The above and yet other objects and advantages of the present invention will become apparent from the hereinafter set forth Detailed Description of the Invention, the Drawings, and Claims appended herewith.

BRIEF DESCRIPTION OF THE DRAWINGS

FIG. 8A is an end cross-sectional view of the strut-nut system after installation.

FIG. 8B is an end cross-sectional view of the strut-nut system during installation within a UNI-STRUT channel.

DETAILED DESCRIPTION OF THE INVENTION

Figure 1:
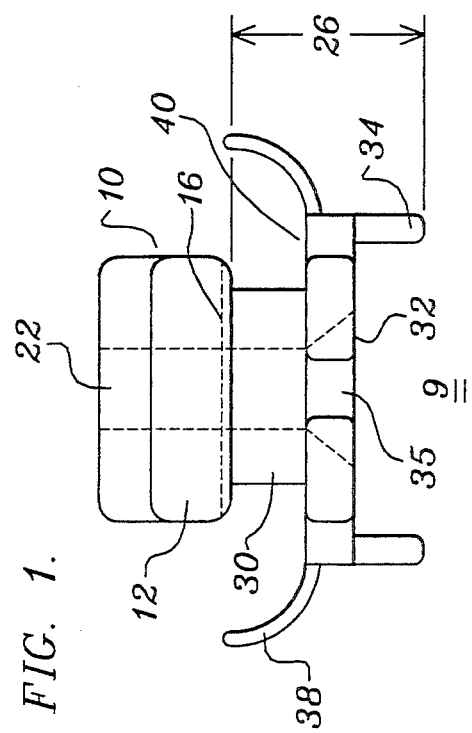
FIG. 1 is a side elevational view of the nut portion of the strut-nut system.
Figure 7:
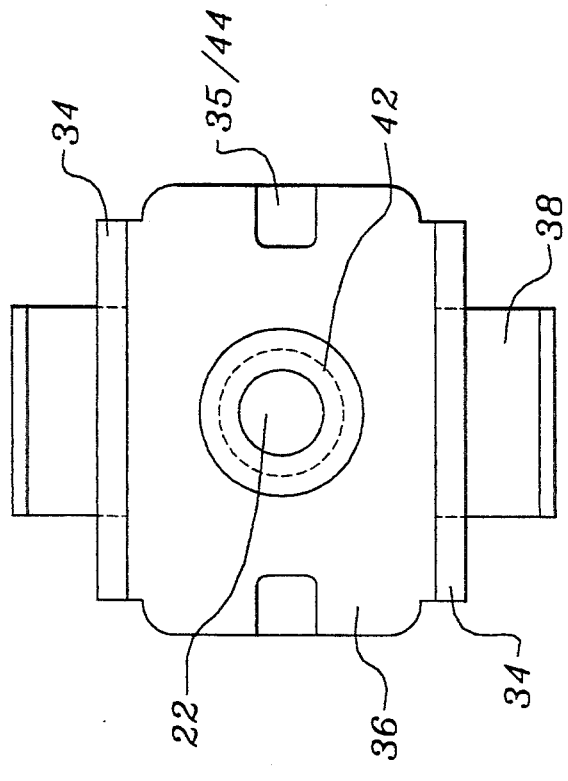
FIG. 7 is a bottom view of the strut-nut system shown in FIG. 3.
Figure 4:
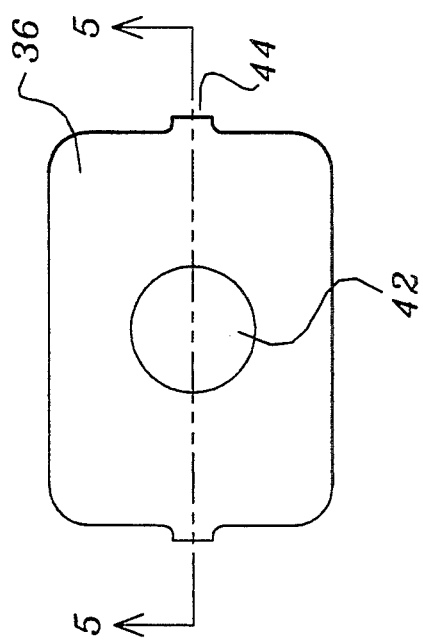
FIG. 4 is a top view of a special-purpose washer which is a part of the inventive strut-nut system.
Figure 6:
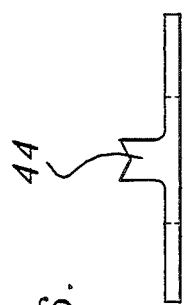
FIG. 6 is a front view of the washer shown in FIG. 4.
Figure 5:
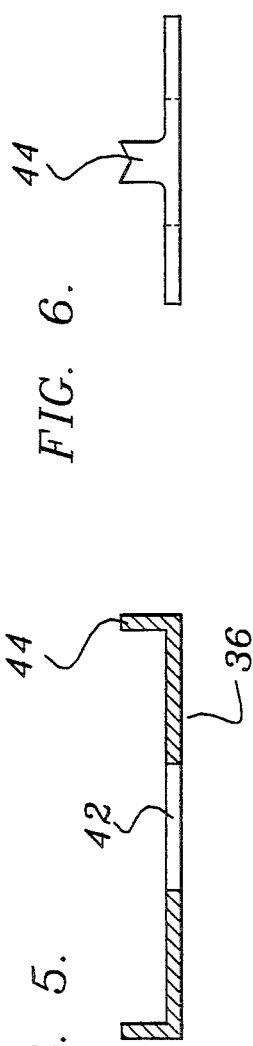
FIG. 5 is a side cross-sectional view of the washer taken along Line 5—5 of FIG. 4.
Figure 9:
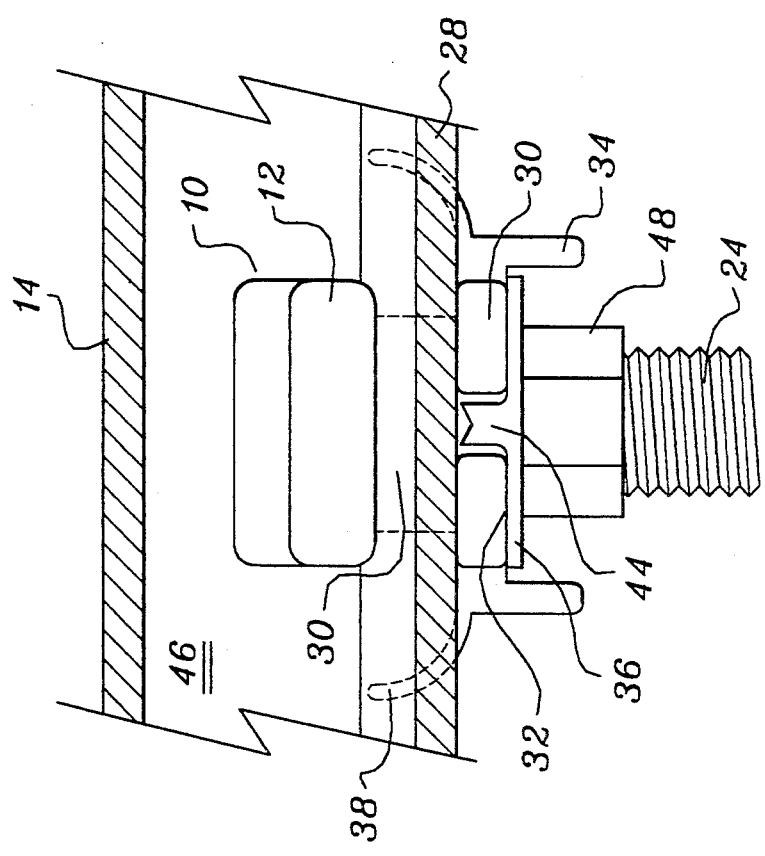
FIG. 9 is a longitudinal cross-sectional view of the strut-nut system within the UNI-STRUT channel taken along Line 9—9 of FIG. 8A.

With reference to the side view of FIG. 1, the instant inventive self-locking strut-nut system 9 may be seen to include an upper means 10 proportioned, through the provision of projecting element 12, for selectable lockable engagement within a longitudinal rectangular channel of a constructional rod 24 of the type shown in FIGS. 8 and 9.

Figure 3:
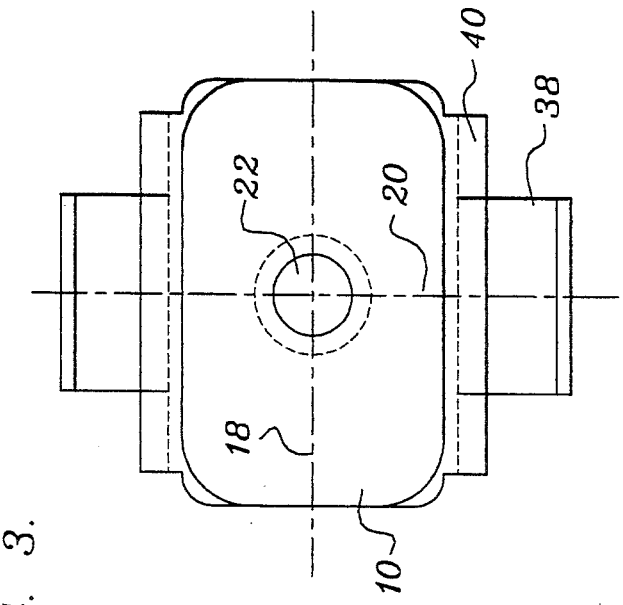
FIG. 3 is a top view of the system of FIG. 2.
Figure 2:
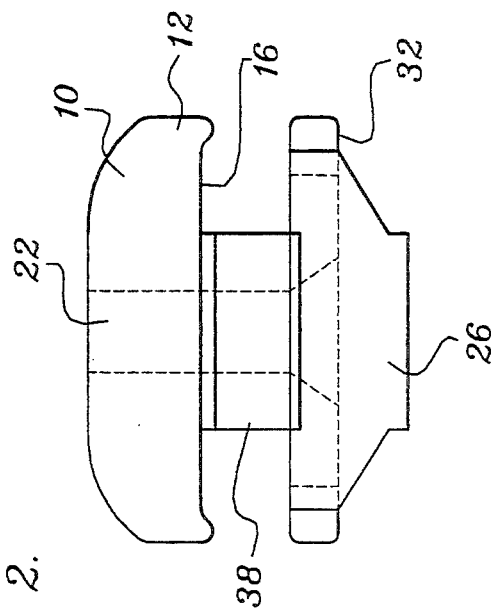
FIG. 2 is a front view of the system of FIG. 1.

With reference to said FIG. 1 and the front view of FIG. 2 it is to be appreciated that a lower surface 16 of said upper means 10 defines a medial plane of the entire strut-nut system 9. It is noted that said upper means 10 also defines a major axis 18 and a minor axis 20 about an origin in threaded channel 22 as shown in FIG. 3. Said channel 22 comprises means for the threadable receipt of a complementally threadable rod 24 shown in FIGS. 8 to 10. As may be seen said channel 22 exhibits an axis transverse to said lower surface 16 of upper means 10 and, further, extends the entire vertical length of the strut nut system 9.

Further provided as an integral part of the strut-nut system is lower engagement means 26 which is proportioned for selectable lockable engagement externally against and beneath truck 28 of the rectangular channel 14. As may be noted in FIGS. 1, 2 and 8, said lower means 26 extends integrally downwardly, from surface 16 of upper means 10, through a central neck 30 of the strut-nut system 9 to a surface 40. Further defined by said lower means 26 is a lowermost plane 32 which possesses major and minor axes that are co-parallel to said major and minor axes 18 and 20 of said upper means 10. Said lower means 26 also includes downwardly projecting elements 34 and recesses 35, the purpose of which is to assist in the stabilization of washer 36 described below.

Projecting outwardly in the direction of said minor axis 20 of upper means 10 are deformable locking fins 38 which depend integrally outwardly and oppositely along the minor axis of said lower engagement means 26 preferably from the surface 40 which is co-parallel with said lowermost plane 32.

With reference to the views of FIGS. 4 thru 7 there is shown a planar washer 36 having a central aperture 42 therein. The washer 36 includes ear elements 44 for complemental engagement with said lowermost plane 32 of said lower engagement means 26. Also, said aperture 42 is proportioned for receipt of said threaded rod 24, and when positioned on said plane 32 is co-linear with said channel 22.

Figure 10:
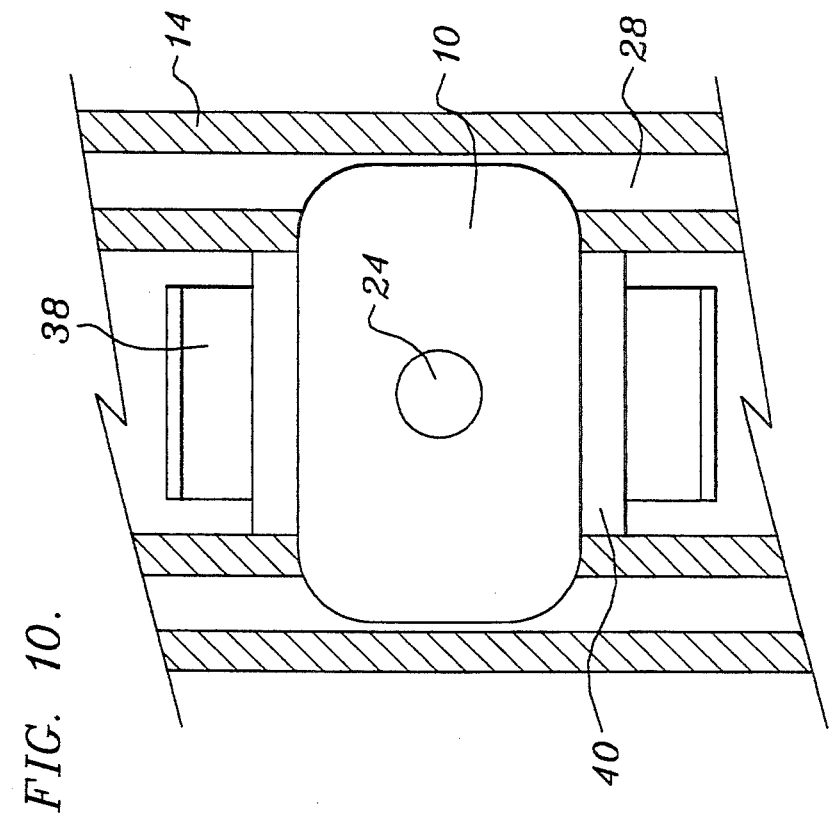
FIG. 10 is a top cross-sectional view taken along Line 10—10 of FIG. 8A.

The entire strut-nut system 9 when installed into longitudinal channel 14 is shown in the views of FIGS. 8 thru 10, wherein FIG. 9 is a side view taken along Line 9—9 of FIG. 8A and FIG. 10 is a top cross-sectional view taken along Line 10—10 of FIG. 8A. As may be noted in the transition from FIG. 8B to FIG. 8A to FIG. 9, said locking fins 38 are pulled into a void 46 of longitudinal channel 14 as the strut-nut system is rotated into its locked position between tracks 28 of the channel 14.

The rotation of nut 48 on threaded element 24 (see FIGS. 9 and 10) will operate to tighten washer 36 against neck 30 of lower engagement means 26 which will yet further increase the stability of threaded rod 24 in the strut-nut system 9 and relative to the channel 14. Further, ear elements 44 will grip tracks 28 as said nut 48 is rotationally tightened into tracks 28 of the channel 14.

Accordingly while there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described our invention what we claim as new, useful and non-obvious and, accordingly, secure by Letters Patent of the United States is:

1. A self-locking strut-nut system for securement within a rectangular constructional channel, the strut-nut system comprising:
   (a) upper means proportioned for selectable lockable engagement within said rectangular channel, an upper surface of said means defining an upper plane of said strut-nut system, an said engagement means also defining a major axis and a minor axis, each co-parallel with said upper plane;
   (b) connecting means depending integrally downwardly from a lower surface of said upper means, said connecting means including a bore for threadable receipt of a complementally threaded rod, said bore having an axis normal to said upper plane, said bore extending along a length of said strut-nut system co-linear with said normal axis;
   (c) lower means proportioned for selectable lockable engagement externally against and beneath said rectangular channel, said lower engagement means extending integrally downwardly and outwardly from said connecting means and defining, co-parallel to said upper plane of said upper means, a lower plane upon a surface of said lower means opposite from said integral dependency of said lower means from said connecting means, said lower plane defining major and minor axes each respectively co-parallel to said major and minor axes of said upper means; and
   (d) two deformable locking fins depending integrally outwardly, and oppositely, along said major axis of said lower engagement means.

2. The strut-nut system as recited in claim 1, further comprising:
   (e) a planar washer having a centrally-located aperture therein, said washer including means for complemental engagement with said lowermost plane of said lower engagement means, said aperture proportioned for receipt of said threaded rod.

3. The strut-nut system as recited in claim 1, in which said locking fins each curve upwardly relative to said lowermost plane of said system.

* * * * *